(12) United States Patent
Han

(10) Patent No.: US 9,279,472 B2
(45) Date of Patent: Mar. 8, 2016

(54) MOUNTING DEVICE FOR ABSORBING VIBRATION

(71) Applicant: Hyundai Motor Company, Seoul (KR)

(72) Inventor: Sang Hoon Han, Bucheon-Si (KR)

(73) Assignee: Hyundai Motor Company, Seoul (KR)

( * ) Notice: Subject to any disclaimer, the term of this patent is extended or adjusted under 35 U.S.C. 154(b) by 154 days.

(21) Appl. No.: 14/106,646

(22) Filed: Dec. 13, 2013

(65) Prior Publication Data

US 2015/0060633 A1    Mar. 5, 2015

(30) Foreign Application Priority Data

Aug. 28, 2013 (KR) .......................... 10-2013-0102438

(51) Int. Cl.
| F16F 15/02 | (2006.01) |
| F16F 15/04 | (2006.01) |
| F16F 15/08 | (2006.01) |
| F16F 13/10 | (2006.01) |
| B60K 5/12 | (2006.01) |
| F16F 15/023 | (2006.01) |

(52) U.S. Cl.
CPC .............. *F16F 13/10* (2013.01); *B60K 5/1208* (2013.01); *F16F 15/023* (2013.01); *F16F 15/04* (2013.01); *F16F 15/08* (2013.01)

(58) Field of Classification Search
CPC ......... F16F 15/02; F16F 15/023; F16F 15/04; F16F 15/08
See application file for complete search history.

(56) References Cited

U.S. PATENT DOCUMENTS

| 4,159,091 | A * | 6/1979 | Le Salver | F16F 9/3415 248/634 |
| 6,017,024 | A * | 1/2000 | Muramatsu | F16F 13/20 267/140.14 |
| 6,527,262 | B2 * | 3/2003 | Hagino | F16F 13/264 267/140.14 |
| 6,902,156 | B2 * | 6/2005 | Muramatsu | F16F 13/26 267/140.15 |
| 9,033,321 | B2 * | 5/2015 | Lee | F16F 13/268 267/140.14 |
| 2009/0140476 | A1 * | 6/2009 | Michiyama | F16F 13/106 267/121 |
| 2009/0224446 | A1 * | 9/2009 | Ishiguro | F16F 15/02 267/140.14 |
| 2010/0072683 | A1 * | 3/2010 | Saito | F16F 13/106 267/140.13 |

(Continued)

FOREIGN PATENT DOCUMENTS

| JP | 2009-216170 A | 9/2009 |
| KR | 10-2009-0062257 A | 6/2009 |

*Primary Examiner* — Ryan Kwiecinski
(74) *Attorney, Agent, or Firm* — Morgan, Lewis & Bockius LLP

(57) ABSTRACT

A mounting device for absorbing vibration may include a housing, a mounting bolt having a first end portion inserted into the housing, a core supported inside the housing, an elastic member disposed between an outer surface of the core and an inner surface of the housing, and a separator having an outer surface fixed to an inner circumferential surface of the housing and configured to separate a first chamber and a second chamber in the housing, wherein the separator includes a mounting bracket having an outer surface fixed to the inner surface of the housing, and a center portion hole, and a membrane mounted to the mounting bracket and having a slit formed by being cut along a predetermined line within a region which corresponds to the center portion hole, and wherein a bridge is formed in the center portion hole of the mounting bracket.

5 Claims, 7 Drawing Sheets

(56) References Cited

U.S. PATENT DOCUMENTS

| | | | |
|---|---|---|---|
| 2010/0102495 A1* | 4/2010 | Okumura | F16F 13/108 267/140.13 |
| 2012/0299229 A1* | 11/2012 | Kubo | F16F 13/106 267/140.13 |
| 2013/0175745 A1* | 7/2013 | Kojima | F16F 13/108 267/140.13 |
| 2014/0175719 A1* | 6/2014 | Kanaya | F16F 13/106 267/140.13 |
| 2014/0246821 A1* | 9/2014 | Koga | F16F 13/105 267/140.13 |
| 2015/0069686 A1* | 3/2015 | Okumura | F16F 13/08 267/140.13 |
| 2015/0123326 A1* | 5/2015 | Kadowaki | F16F 13/106 267/140.13 |
| 2015/0123327 A1* | 5/2015 | Saito | F16F 13/08 267/140.13 |

\* cited by examiner

MOUNTING DEVICE FOR ABSORBING VIBRATION

CROSS-REFERENCE TO RELATED APPLICATION

The present application claims priority to Korean Patent Application No. 10-2013-0102438 filed on Aug. 28, 2013, the entire contents of which is incorporated herein for all purposes by this reference.

BACKGROUND OF THE INVENTION

1. Field of the Invention

The present invention relates to a mounting device for absorbing vibration which effectively attenuates small displacement vibration and large displacement vibration caused by a vibration source such as an engine, and has a simple structure.

2. Description of Related Art

In general, in order to improve vibration and noise characteristics of a vehicle, a mounting device for absorbing vibration and noise is provided between an engine and a vehicle body.

When an elastic coefficient of the mounting device is set to be low, vibration and noise are reduced in an idle state of an engine, but secondary vibration, which causes the vehicle to be shaken, occurs due to characteristics of a suspension system or a power train, and a phase difference, when the vehicle runs.

Conversely, when an elastic coefficient of the mounting device is set to be high, there is a problem in that vibration and noise of the engine are transmitted to a vehicle body when the engine is in an idle state and when the vehicle runs.

Therefore, a fluid engine mounting device, which uses a fluid, has been developed, and the fluid engine mounting device absorbs vibration in an up and down direction (z-direction) using a fluid that flows through a first chamber (upper chamber) and a second chamber (lower chamber).

Meanwhile, efficiency of reducing vibration and noise may deteriorate in a predetermined frequency region due to a rubber membrane that separates the upper chamber and the lower chamber, and a technology of actively reducing vibration and noise by installing a solenoid valve and a controller has been introduced, but the technology causes an increase in costs.

In addition, a technology in which a slit (cut portion) is formed in the membrane has been introduced, but attenuation efficiency may deteriorate when displacement caused by a vibration source is large.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting device for absorbing vibration capable of simultaneously reducing small displacement vibration and large displacement vibration occurring between an engine and a vehicle body and saving costs.

In an aspect of the present invention, a mounting device for absorbing vibration may include a housing having a first side configured to be fixed to a vehicle body, a mounting bolt having a first end portion inserted into the housing, and a second end portion configured to be connected to a vibration source, a core supported inside the housing and configured to enclose the first end portion of the mounting bolt, an elastic member disposed between an outer surface of the core and an inner surface of the housing and configured to absorb displacement between the mounting bolt and the housing, and a separator having an outer surface fixed to an inner circumferential surface of the housing and configured to separate a first chamber and a second chamber in the housing, wherein the separator may include a mounting bracket having an outer surface fixed to the inner surface of the housing, and a center portion hole formed in a center portion thereof, and a membrane mounted to the mounting bracket so as to close the center portion hole and having a slit formed by being cut along a predetermined line within a region which corresponds to the center portion hole, and wherein a bridge is formed in the center portion hole of the mounting bracket so as to support the membrane.

The bridge is formed across the center portion hole.

The slit is formed to may have a cross shape, and the bridge is formed to correspond to the cross shape.

The mounting device for the absorbing vibration may further include a diaphragm mounted to a lower portion of the housing which is opened outward to form the second chamber, the diaphragm configured to be deformed by pressure of the second chamber.

The vibration source is an engine.

A width of the slit is smaller than a width of the bridge.

A region corresponding to the width of the slit is may include d in a region corresponding to the width of the bridge so that one surface of the bridge is able to close the slit.

A convex portion, which is convex in a direction toward the membrane, is formed on the bridge at a center portion of the center portion hole.

A groove having a recessed shape is formed in the convex portion so as to correspond to a portion where the slit intersects.

As described above, in the mounting device for absorbing vibration according to the exemplary embodiment of the present invention, when displacement of vibration is small, a fluid flows through the slit such that small displacement vibration is reduced, and when displacement of vibration is large, the slit is closed by the bridge while the membrane is deformed such that large displacement vibration is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
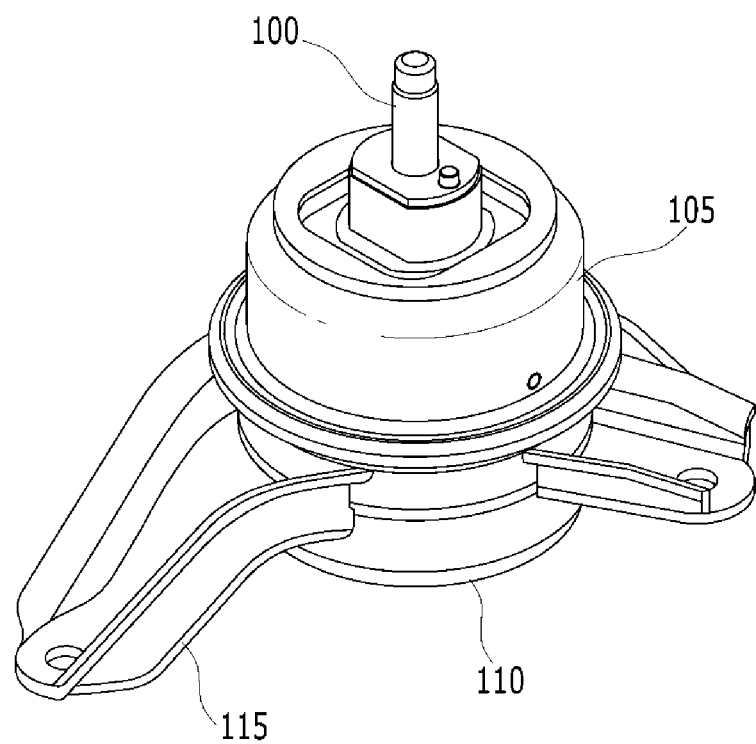
FIG. 1 is a perspective view of a mounting device for absorbing vibration according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a mounting device for absorbing vibration according to an exemplary embodiment of the present invention.

Referring to FIG. 1, a mounting device for absorbing vibration includes a mounting bolt 100, an upper housing 105, a lower housing 110, and a vehicle body connecting portion 115.

The upper housing 105 has an upside down cup shape, an upper center portion of the upper housing 105 is opened outward, and a lower end portion of the mounting bolt 100 is inserted into the upper housing 105. Further, the lower housing 110 is coupled to the upper housing 105, and a vehicle body connecting portion 115, which is connected to a vehicle body, is formed on an outer surface of the lower housing 110.

A vibration source such as an engine is connected to the mounting bolt 100, and an elastic member 205, which is interposed between the mounting bolt 100 and the lower housing 110, absorbs and reduces displacement due to vibration.

Figure 2:
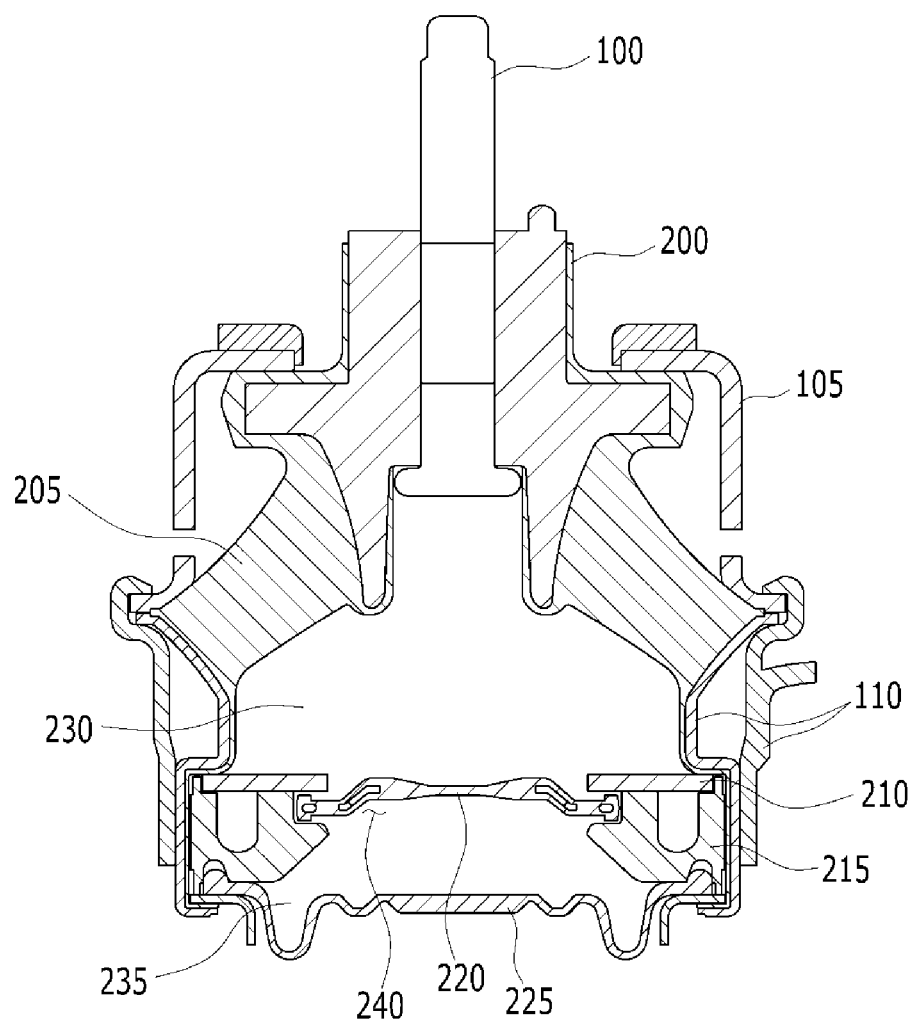
FIG. 2 is a cross-sectional view of the mounting device for absorbing vibration according to the exemplary embodiment of the present invention.

FIG. 2 is a cross-sectional view of the mounting device for absorbing vibration according to the exemplary embodiment of the present invention.

Referring to FIG. 2, the mounting device for absorbing vibration includes a core 200 configured to enclose a center portion outer surface and a lower end portion of the mounting bolt 100, an elastic member 205 interposed between an outer surface of the core 200 and the lower housing 110, a diaphragm 225 disposed at an opened portion of a lower center portion of the lower housing 110 and configured to seal the opened portion, and a separator disposed between the elastic member 205 and the diaphragm 225 and configured to form a first chamber 230 provided at an upper side and a second chamber 235 provided at a lower side.

As illustrated, the separator includes a mounting bracket 215, a fixing plate 210, and a membrane 220.

An outer surface of the mounting bracket 215 is fixed in the lower housing 110, the membrane 220 is disposed in a center portion hole 240, which is formed in a center portion of the mounting bracket 215, so as to separate the first chamber 230 and the second chamber 235, and the fixing plate 210 fixes an edge of the membrane 220 to the fixing plate 210.

The diaphragm 225 is mounted in a hole, which is opened toward a lower side of the lower housing 110, so as to seal the second chamber 235, and as illustrated, an edge of the diaphragm 225 is fixed to the lower housing 110 by the mounting bracket 215.

Figure 3:
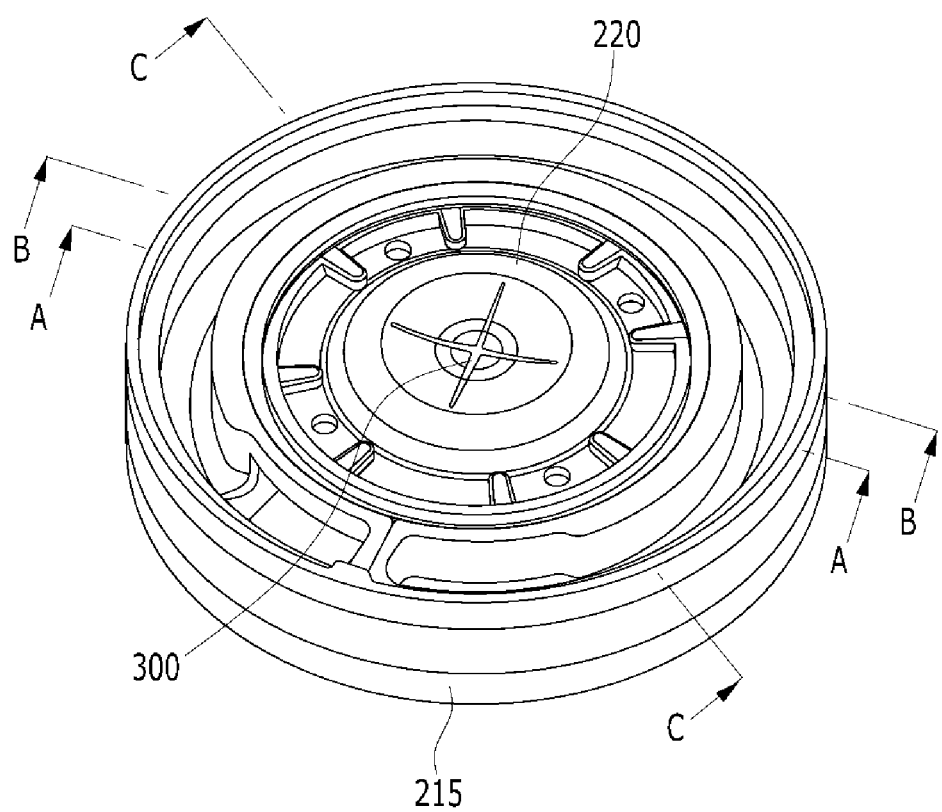
FIG. 3 is a partial perspective view of the mounting device for absorbing vibration according to the exemplary embodiment of the present invention.

FIG. 3 is a partial perspective view of the mounting device for absorbing vibration according to the exemplary embodiment of the present invention. FIG. 3 illustrates a state in which the fixing plate 210 is separated from the mounting bracket 215.

The membrane 220 is mounted in the center portion hole 240 of the mounting bracket 215, and a slit 300 having a cross shape is formed in the membrane 220. The first chamber 230 and the second chamber 235 are connected to each other through the slit 300, and a fluid may flow through the slit 300.

Figure 4:
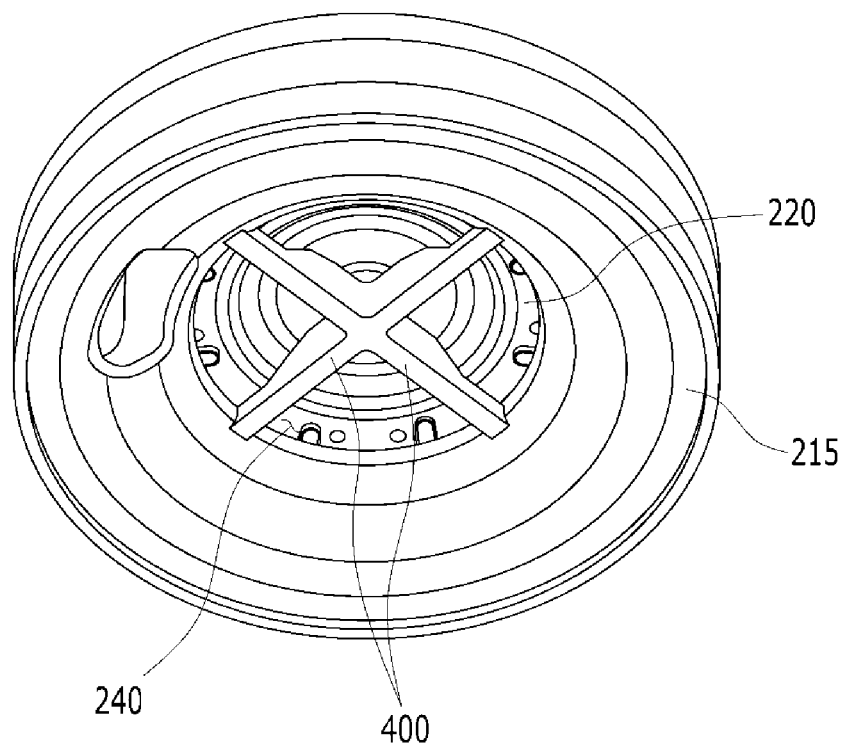
FIG. 4 is a lower perspective view of FIG. 3.

FIG. 4 is a lower perspective view of FIG. 3. Referring to FIG. 4, a bridge having a cross shape is formed in the center portion hole of the mounting bracket.

The bridge 400 may be fixed to the mounting bracket in the form of a cross along a route along which the slit 300 is formed, and the bridge 400 may be integrally formed with the mounting bracket 215. In the exemplary embodiment of the present invention, the bridge 400 is formed to support the membrane 220.

Figure 5:
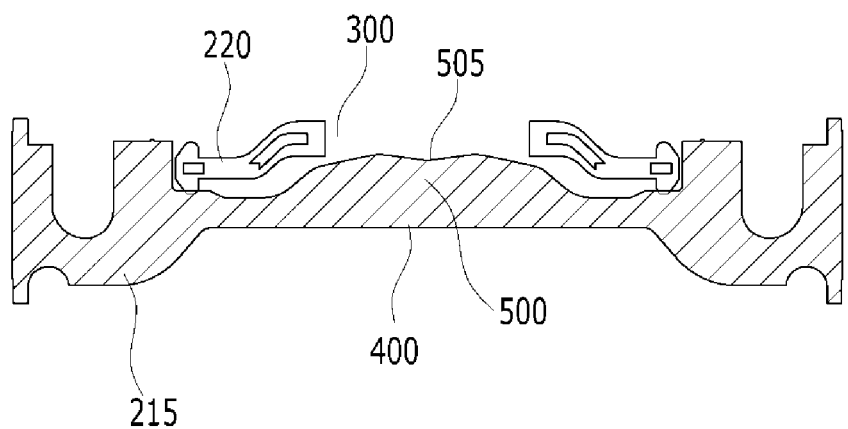
FIG. 5 is a cross-sectional view taken along line A-A of FIG. 3.
Figure 6:
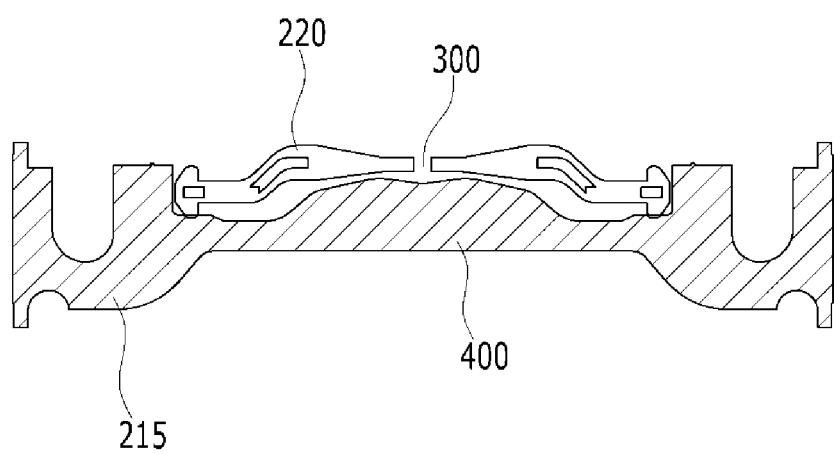
FIG. 6 is a cross-sectional view taken along line B-B of FIG. 3.

FIG. 5 is a cross-sectional view taken along line A-A of FIG. 3, and FIG. 6 is a cross-sectional view taken along line B-B of FIG. 3.

Referring to FIGS. 5 and 6, the slit 300 is formed to be elongated in a center portion of the membrane 220, and the bridge 400 is formed at a portion where the slit 300 is formed.

A convex portion 500, which is entirely convex upward, is formed on a center portion of the bridge 400, and a groove 505 is formed in an uppermost portion at a center of the convex portion 500.

The convex portion 500 formed on the bridge 400 effectively supports a lower portion of the membrane 220, and the groove 505 formed in the uppermost portion of the convex portion 500 helps a fluid to flow through the slit 300.

Figure 7:
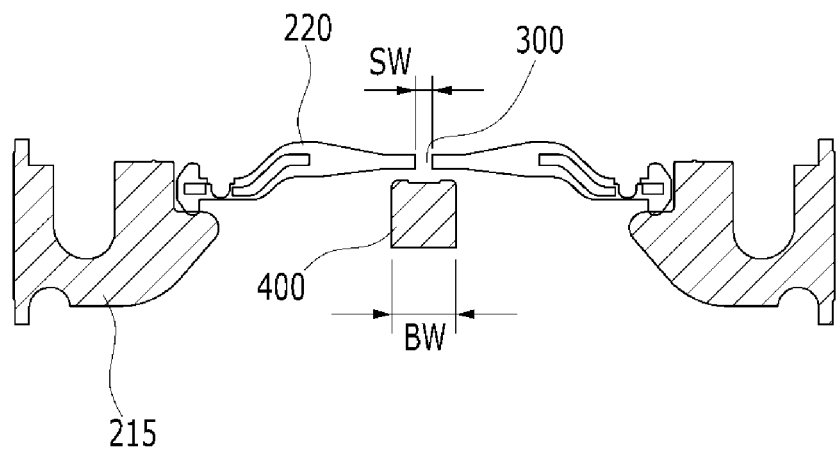
FIG. 7 is a cross-sectional view taken along line C-C of FIG. 3.

FIG. 7 is a cross-sectional view taken along line C-C of FIG. 3.

Referring to FIG. 7, the bridge 400 has a predetermined bridge width (BW), and the slit 300 has a predetermined slit width (SW). Further, the bridge width (BW) is longer than the slit width (SW), and the slit width (SW) is formed within a region which corresponds to the bridge width (BW).

That is, the fluid passing through the slit 300 reaches an upper surface of the bridge 400, and flows toward both sides of the bridge 400.

In the exemplary embodiment of the present invention, a structure is provided in which small displacement vibration such as vibration noise of an engine and large displacement vibration such as a movement of the engine when a vehicle runs are simultaneously reduced without a control apparatus such as a separate electronic control mount (ECM).

That is, when the mounting bolt 100 is moved to a lower portion of the lower housing 110 and displacement between the mounting bolt 100 and the lower housing 110 is small, the fluid flows to the second chamber 235 through the slit 300 such that the small displacement vibration is reduced, and when the displacement is large, the membrane 220 is deformed such that large displacement vibration is reduced by a structure in which the slit 300 is closed by the bridge 400.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting device for absorbing vibration comprising:
    a housing having a first side configured to be fixed to a vehicle body;
    a mounting bolt having a first end portion inserted into the housing, and a second end portion configured to be connected to a vibration source;
    a core supported inside the housing and configured to enclose the first end portion of the mounting bolt;
    an elastic member disposed between an outer surface of the core and an inner surface of the housing and configured to absorb displacement between the mounting bolt and the housing; and
    a separator having an outer surface fixed to an inner circumferential surface of the housing and configured to separate a first chamber and a second chamber in the housing,
    wherein the separator includes:
        a mounting bracket having an outer surface fixed to the inner surface of the housing, and a center portion hole formed in a center portion thereof; and
        a membrane mounted to the mounting bracket so as to close the center portion hole and having a slit formed by being cut along a predetermined line within a region which corresponds to the center portion hole, and
    wherein a bridge is formed in the center portion hole of the mounting bracket so as to support the membrane,
    wherein the bridge is formed across the center portion hole,
    wherein the slit is formed to have a cross shape, and the bridge is formed to correspond to the cross shape,
    wherein a convex portion, which is convex in a direction toward the membrane, is formed on the bridge at a center portion of the center portion hole, and
    wherein a groove having a recessed shape is formed in the convex portion so as to correspond to a portion where the slit intersects.

2. The mounting device for the absorbing vibration of claim 1, further comprising:
    a diaphragm mounted to a lower portion of the housing which is opened outward to form the second chamber, the diaphragm configured to be deformed by pressure of the second chamber.

3. The mounting device for the absorbing vibration of claim 1, wherein the vibration source is an engine.

4. The mounting device for the absorbing vibration of claim 1, wherein a width of the slit is smaller than a width of the bridge.

5. The mounting device for the absorbing vibration of claim 4, wherein a region corresponding to the width of the slit is included in a region corresponding to the width of the bridge so that one surface of the bridge is able to close the slit.

* * * * *